3,385,888
METHOD FOR PREPARING CHLOROPIVALIC
ACID
Elmore L. Martin, Shellburne, Wilmington, Del., assignor to E. I. du Pont de Nemours and Company, Wilmington, Del., a corporation of Delaware
No Drawing. Filed Feb. 1, 1965, Ser. No. 429,639
5 Claims. (Cl. 260—539)

ABSTRACT OF THE DISCLOSURE

Carbonylation of 1,2-dichloro-2-methylpropane or 2-chloro-2-methylpropane with carbon monoxide, water and hydrogen fluoride at from 0 to 140° C. and 10 to 1,000 atmospheres pressure to form β-chloropivalic acid or pivalic acid.

This invention relates to the synthesis of β-chloropivalic acid or pivalic acid from the reaction of 1,2-dichloro-2-methylpropane or 2-chloro-2-methylpropane with carbon monoxide, water and hydrogen fluoride, with or without the presence of an additional acid catalyst.

One known process for the production of aliphatic carboxylic acids from halogenated hydrocarbons involves the use of steam and, optionally, a catalyst such as chlorine or hydrochloric acid, and temperatures of 200 to 400° C. over an absorbent material such as pumice, silica, gel or active carbon such as described in U.S. Patent No. 1,993,555.

It has now been found that in the liquid phase and using hydrogen fluoride as the catalyst that the absorbent material can be eliminated and that low temperatures may be used to produce high yields (65% or more) of pivalic acid or chloropivalic acid from 2-chloro-2-methylpropane or 1,2-dichloro-2-methylpropane. In performing the present invention, an autoclave or other pressure reactor is charged with either 2-chloro-2-methylpropane or 1,2-dichloro-2-methylpropane, water, hydrogen fluoride, and, if desired, a catalyst such as boron trifluoride, formic acid or $Cu(BF_4)_2$.

The temperature is maintained in the range of from 0 to 140° C. and preferably from 30 to 75° C. Below this temperature the reaction is too slow to be practical and at increasing temperatures side reactions take place so as to lower the yield of the preferred acid.

The amount of pressure which is used may vary from 10 to 1,000 atmospheres. Below this pressure the reaction becomes slow and above this pressure the yield becomes low. No particular advantage is gained by using pressures above 300 atmospheres.

Reaction times are generally from 15 to 300 minutes but periods of up to 24 hours may be used.

The molar ratio of hydrogen fluoride to alkyl chloride starting material can vary from 2:1 to 20:1 and preferably is from 4:1 to 10:1.

The amount of water used in the process can be varied from 5 to 25 percent based on the hydrogen fluoride.

The following examples are illustrative of the invention.

EXAMPLE I

A two liter autoclave is charged with 171.3 g. (1.85 moles) of 2-chloro-2-methylpropane and 50 ml. of water. The autoclave is then sealed, cooled to −60° C., evacuated, purged with nitrogen repeatedly and finally charged with 400 g. of liquid hydrogen fluoride. The autoclave is then heated to 35° C. and pressured to 100 atmospheres with carbon monoxide. These conditions are maintained for 90 minutes after which the pressure is reduced and the autoclave is opened, the resulting contents are discharged onto ice affording pivalic acid as an oil which is dissolved in methylene chloride, the aqueous layer is extracted three times with methylene chloride. The combined extracts are washed with a saturated aqueous sodium chloride solution and dried over anhydrous sodium sulfate. The 2-chloro-2-methyl-propane was 90% converted. Gas chromatographic analysis indicates a yield of 88% based on the conversion of 2-chloro-2-methylpropane to pivalic acid. Gas chromatographic analysis, as used in this disclosure, refers to the well-known procedure of passing a vapor in a carrier gas through a column of suitable absorbant phase supported by the walls of the tube or by particular matter. The carrier gas elutes the materials being analyzed in a reproducible time dependent manner. See, for example, "Gas-Liquid Chromotography" by Dal Nogare and Juvet, published by Interscience Publishers, 1962. In order to obtain precise quantitative results, each column and procedure must be calibrated against known mixtures in the concentration range to be encountered with the test samples. In the results herein reported, the major eluted peaks were identified by trapping, followed by infra-red, nuclear magnetic resonance, mass spectrometry, etc., identification. Known mixtures are then prepared and passed through the column for calibration purposes.

EXAMPLE II

A two liter autoclave is charged with 222.2 g. (2.40 moles) of 2-chloro-2-methylpropane and 126 ml. of water. The autoclave is then sealed, cooled to −60° C., evacuated, purged with nitrogen repeatedly and finally charged with 400 g. of liquid hydrogen fluoride. The autoclave is then heated to 35° C. and pressured to 100 atmospheres with carbon monoxide. These conditions are maintained for 180 minutes after which the pressure is reduced and the autoclave is opened, the resulting solution of pivalic acid is recovered as in Example I. 80% of the 2-chloro-2-methylpropane was converted of which 90% is found by gas chromatographic analysis to be pivalic acid.

EXAMPLE III

A 400 ml. Hastelloy lined shaker tube is flushed with nitrogen. 39 g. (0.3 mole) of 1,2-dichloro-2-methylpropane and 6 g. of water are added. The tube is cooled, evacuated, and 100 g. of hydrogen fluoride added. The tube and its contents are allowed to warm to about 0° C. and the tube is then pressured to 200 atmospheres with carbon monoxide. The pressure is increased to 500 atmospheres when the reaction mixture reaches a temperature of about 15° C., which takes between 5 and 10 minutes, and maintained at 925–950 atmospheres for a period of 15.5 hours. The temperature is maintained at 30–40° C. during this time. After cooling to room temperature, the excess carbon monoxide is bled off slowly and the contents of the tube are transferred to a polyethylene container. The resulting hydrogen fluoride solution is poured onto excess ice with stirring whereupon a solid separates. About 75 ml. of methylene chloride is added, the organic layer is separated and the aqueous layer is extracted an additional three times with 75 ml. portions of methylene chloride. The combined extracts are washed once with a saturated sodium chloride solution and dried with anhydrous magnesium sulfate. A small amount of sodium fluoride is also added to remove trace amounts of hydrogen fluoride. The inorganic reagents are removed by filtration, and the filtrate is concentrated at atmospheric pressure on a steam bath. The yield of chloropivalic acid B.P. 98° C./7 mm., Hg is 28 g. (67%).

EXAMPLE IV

A 400 ml. stainless steel shaker tube is cooled, evacuated and charged with 14 ml. of water and 135 g. of hydrogen fluoride. After pressuring to 200 atmospheres with carbon monoxide at 65–66° C., 96 g. of 1,2-dichloro-2-methylpropane are injected into the tube over a period of 90 minutes and the reaction is continued at 65–66° C. for 60 minutes, during which time the pressure drops to 175 atmospheres. The carbon monoxide is then bled off slowly and the contents of the tube transferred to a polyethylene container. The resulting solution is poured onto a mixture of excess ice and 50 ml. of methylene chloride. The organic layer is separated and the aqueous layer is extracted three additional times with 75–80 ml. portions of methylene chloride. The combined methylene chloride extracts are washed once with a saturated sodium chloride solution and dried with anhydrous magnesium sulfate. A small amount of sodium fluoride is also added to remove trace amounts of hydrogen fluoride. The inorganic reagents are removed by filtration and the filtrate is concentrated to atmospheric pressure on a steam bath. Distillation of the residue yields 95 g. (94%) of chloropivalic acid.

Pivalic acid and chloropivalic acid, as prepared by the process of this invention, are useful as chemical intermediates in the formation of esters, amides, and salts which are useful as lubricants and plasticizers. Glycols such as 2-ethyl-hexane-1,3-diol and most sugars and similar carbohydrates may be esterified with these acids to produce satisfactory ester synthetic lubricants, lubricant thinners, lubricant thickeners, and plasticizers. Cellulosic material such as cotton and wood pulp may be esterified to produce gelling and emulsifying agents. Salts such as lithium pivalate find use as antiknock agents for gasolene. Pivalic acid is also useful as a solubilizer for metals in paint driers.

I claim:

1. A process which consists essentially of contacting, in the liquid phase, an alkyl chloride selected from the class consisting of 2-chloro-2-methylpropane and 1,2-dichloro-2-methylpropane with hydrogen fluoride present in a molar ratio of from 2:1 to 20:1 based on the alkyl chloride, from 5 to 25% water based on the hydrogen fluoride, and carbon monoxide at a temperature of from 0 to 140° C., and a pressure of from 10 to 1,000 atmospheres, and recovering an acid selected from the class consisting of pivalic acid and chloropivalic acid.

2. The process of claim 1 wherein the temperature is maintained at from 30 to 75° C.

3. The process of claim 2 wherein the molar ratio of hydrogen fluoride to alkyl chloride is from 4:1 to 10:1.

4. The process of claim 3 wherein the alkyl chloride is 2-chloro-2-methylpropane and the recovered acid is pivalic acid.

5. The process of claim 3 wherein the alkyl chloride is 1,2-dichloro-2-methylpropane and the recovered acid is chloropivalic acid.

References Cited

UNITED STATES PATENTS

| | | | |
|---|---|---|---|
| 1,993,555 | 3/1935 | Larson | 260—540 |
| 2,449,163 | 9/1948 | Ford | 260—539 |
| 2,570,793 | 10/1951 | Gresham et al. | 260—544 |
| 2,580,070 | 12/1951 | Brooks et al. | 260—539 |
| 2,680,763 | 6/1954 | Brubaker | 260—497 |
| 2,975,199 | 3/1961 | Friedman et al. | 260—497 |

OTHER REFERENCES

Friedman et al. J. Org. Chem., vol. 26 (October 1961), pp. 3751–3754.

LORRAINE A. WEINBERGER, *Primary Examiner.*

A. P. HALLUIN, *Assistant Examiner.*